D. M. ENGEL.
AUTOMOBILE SEAT.
APPLICATION FILED AUG. 26, 1913.
1,087,003.
Patented Feb. 10, 1914.
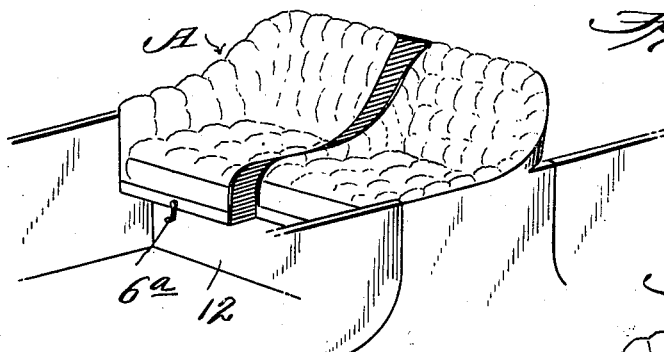
Fig. 1.
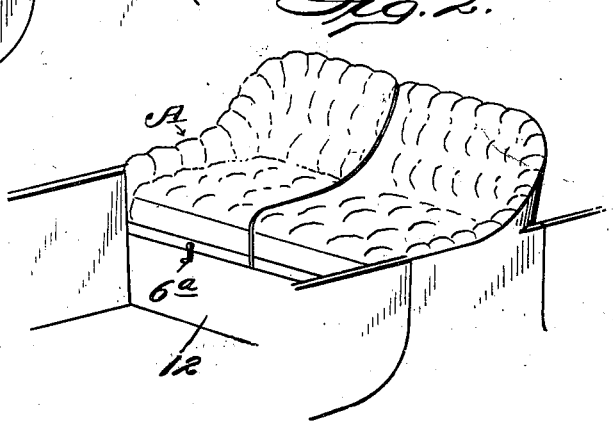
Fig. 2.
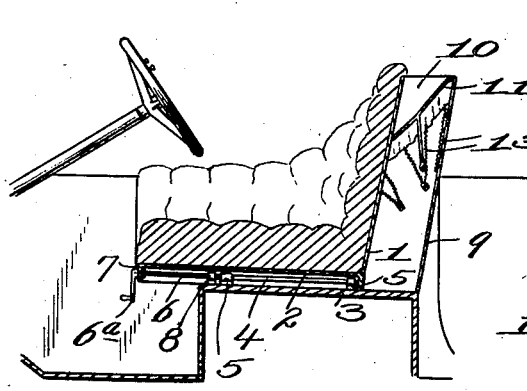
Fig. 3.
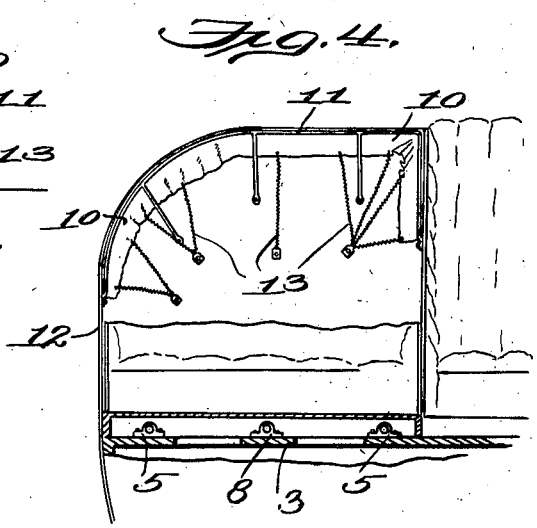
Fig. 4.
Witnesses:
M. E. McDade
Norris L. Sumby
Inventor
Daniel M. Engel
by
Attorney

UNITED STATES PATENT OFFICE.

DANIEL M. ENGEL, OF FAIRBANKS, WASHINGTON.

AUTOMOBILE-SEAT.

1,087,003.

Specification of Letters Patent. Patented Feb. 10, 1914.

Application filed August 26, 1913. Serial No. 786,779.

*To all whom it may concern:*

Be it known that I, DANIEL M. ENGEL, a citizen of the United States, residing at Fairbanks, in the county of Whitman and State of Washington, have invented new and useful Improvements in Automobile-Seats, of which the following is a specification.

This invention relates to improvements in automobile seats and it proposes a construction whereby the seat proper may be adjusted within certain limits, forwardly or rearwardly of the vehicle, to further the convenience of the chauffeur in reaching and manipulating the various levers and devices by which the operation of the vehicle is controlled.

The objects of the invention are to provide an automobile seat having means of simple, compact, and inexpensive nature for effecting the adjustments aforesaid, and to provide an adjustable seat which, in any position thereof, presents the same general appearance as an ordinary seat, the operating parts being completely concealed.

An embodiment of the invention is illustrated in the accompanying drawings, wherein:—

Figure 1 is a perspective view of an automobile seat in which the features of the invention are incorporated; Fig. 2 is a perspective view of the improved seat, both parts being shown in normal position; Fig. 3 is a vertical longitudinal sectional view thereof; Fig. 4 is a front elevation, the back of the seat being partly broken away to expose to view the operating parts in the rear of the seat.

Similar characters of reference designate corresponding parts throughout the several views.

The drawings show a pair of juxtaposed seats, one of which, as A, is constructed in accordance with the invention. Obviously, however, the features of the invention are applicable to constructions where there is but a single seat extending the width of the vehicle.

The adjustable seat includes a false back 1 and a false bottom 2, said back and bottom being upholstered in the usual manner. The seat A is supported from a base frame 3, suitable means being provided to positively guide the seat in its adjustable movements along said base frame. Such means, as shown, comprises rails or bars 4 arranged under the bottom 2, and carried thereby, and lugs 5 secured upon the base frame 3 and having openings through which the rails or bars 4 are slidable.

The means for adjusting the seat longitudinally of the car comprises a screw 6 which at its outer end is journaled in a transverse bar 7, forming a part of the bottom 2, and a block or nut 8 which is mounted upon the base frame 3 and through which the screw 6 is threaded. Beyond the bar 7 the screw 6 carries an operating handle 6ᵃ which is so located as to be readily accessible to the driver, enabling the latter to adjust the seat to suit his convenience without changing his position or leaving the seat.

The seat is movable toward and away from a fixed back 9 which adjoins the base frame 3 at the rear thereof, and, in order to conceal the hiatus between the false back and the fixed back, a flexible valence 10 is employed. This valence is secured at its inner edge to the back and sides of the seat A and passes over a guide frame 11 which is secured to the fixed back 9 and to the outer fixed side 12. In order to hold the valence 10 taut, retractile coil springs 13 are secured to the outer edge thereof and also to the fixed back 9 and side 12. The frame 11 is concealed by the valence.

As the seat A is moved forwardly, the valence 10 is pulled against the tension of the springs 13 and is continuously stretched across the space intervening between the backs 1 and 9, in this way concealing the frame 11 and the springs 13, and appearing as a part or continuation of the upholstery of the back proper, it being understood that the valence is of any suitable material, and preferably of the same color as the upholstery. When the seat A is moved rearwardly, the valence is taken up by the springs 13, as is obvious.

Having fully described my invention, I claim:

1. An automobile seat comprising a fixed back and base and a seat proper having a false back and bottom, the false bottom of the seat proper being adjustably movable along the base, a flexible valence interposed between the false back and the fixed back, springs connected to an edge of the valence to keep the latter tautly stretched between said backs in any position of the seat proper, and a guide over which the valence passes.

2. An automobile seat comprising a fixed back and base and a seat proper having a false back and bottom, the false bottom of the seat proper being adjustably movable along the base, a flexible valence connected to the false back, springs connecting the valence and the fixed back, and a guide frame secured to the fixed back and over which the valence passes.

3. An automobile seat comprising a fixed back and base and a seat proper having a false back and bottom, the false bottom of the seat proper being adjustably movable along the base, a flexible valence interposed between the false back and the fixed back, springs connected to an edge of the valence to keep the latter tautly stretched between said backs in any position of the seat proper, a guide over which the valence passes, a nut mounted on the base, and a screw carried by the false bottom and extending longitudinally thereof, the screw being threaded through the nut.

In testimony whereof I have hereunto set my hand in presence of two subscribing witnesses.

DANIEL M. ENGEL.

Witnesses:
 HENRY J. CLARK,
 FLOYD I. CLARK.